US012764578B2

(12) United States Patent
Bin Redhwan et al.

(10) Patent No.: US 12,764,578 B2
(45) Date of Patent: Oct. 13, 2026

(54) RADIO NETWORK NODE, USER EQUIPMENT AND METHODS PERFORMED THEREIN

(71) Applicant: Telefonaktiebolaget LM Ericsson (publ), Stockholm (SE)

(72) Inventors: Sakib Bin Redhwan, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 320 days.

(21) Appl. No.: 18/287,631

(22) PCT Filed: Apr. 11, 2022

(86) PCT No.: PCT/SE2022/050361
§ 371 (c)(1),
(2) Date: Oct. 19, 2023

(87) PCT Pub. No.: WO2022/220726
PCT Pub. Date: Oct. 20, 2022

(65) Prior Publication Data

US 2024/0196253 A1 Jun. 13, 2024

Related U.S. Application Data

(60) Provisional application No. 63/173,521, filed on Apr. 12, 2021.

(51) Int. Cl.
*H04W 24/10* (2009.01)

(52) U.S. Cl.
CPC .................................. *H04W 24/10* (2013.01)

(58) Field of Classification Search
CPC .............................. H04W 24/02; H04W 24/10
See application file for complete search history.

(56) References Cited

U.S. PATENT DOCUMENTS

2020/0037234 A1* 1/2020 Bulakci ................. H04W 76/11
2022/0312305 A1* 9/2022 Lee ....................... H04W 28/06

FOREIGN PATENT DOCUMENTS

WO 2019047784 A1 3/2019

OTHER PUBLICATIONS

3rd Generation Partnership Project, "3rd Generation Partnership Project; Technical Specification Group Radio Access Network; Universal Terrestrial Radio Access (UTRA), Evolved Universal Terrestrial Radio Access (E-UTRA) and Next Generation Radio Access; Radio measurement collection for Minimization of Drive Tests (MDT); Overall description; Stage 2 (Release 16)", 3GPP TS 37.320 V16.4.0 (Mar. 2021), Technical Specification, pp. 1-35.

Vivo, "Mdt Measurement quantities and UE impact", 3GPP TSG-RAN WG2#105bis, Xi'an, China, Apr. 8-12, 2019, R2190334, pp. 1-3.

(Continued)

*Primary Examiner* — Nguyen T Vo
(74) *Attorney, Agent, or Firm* — COATS & BENNETT, PLLC

(57) ABSTRACT

Embodiments herein relate to a method performed by a UE (10) for handling usage of a service in a communication network. The UE (10) stores a first set of information related to an unavailability or availability of a slice in an area. The UE (10) transmits an indication of the stored first set of information to a radio network node (12).

8 Claims, 12 Drawing Sheets

(56) References Cited

OTHER PUBLICATIONS

3rd Generation Partnership Project, "3rd Generation Partnership Project; Technical Specification Group RAN; NR; Study on enhancement of Radio Access Network (RAN) slicing (Release 17)", 3GPP TR 38.832 V1.0.0 (Mar. 2021), Technical Specification, pp. 1-30.
Cmcc, et al., "Presentation of Report to TSG: TR38.832, Version 1.0.0", 3GPP TSG RAN Meeting #91e, Electronic Meeting, Mar. 16-26, 2021, RP-210411, p. 1.
3rd Generation Partnership Project, draft "3rd Generation Partnership Project; Technical Specification Group RAN; NR; Study on enhancement of Radio Access Network (RAN) slicing (Release 17)", 3GPP TR 38.832 V1.0.0 (Mar. 2021), Technical Specification, pp. 1-31.

* cited by examiner

RADIO NETWORK NODE, USER EQUIPMENT AND METHODS PERFORMED THEREIN

TECHNICAL FIELD

Embodiments herein relate to a radio network node, a user equipment (UE), and methods performed therein for communication. Furthermore, a computer program and a computer readable storage medium are also provided herein. In particular, embodiments herein relate to efficiently use services of a network slice comprised in a communication network.

BACKGROUND

In a typical wireless communications network, UEs, also known as wireless communication devices, mobile stations, stations (STA) and/or wireless devices, communicate via a Radio Access Network (RAN) with one or more core networks (CN). The RAN covers a geographical area which is divided into service areas or cell areas, with each service area or cell area being served by radio network node such as an access node e.g. a Wi-Fi access point or a radio base station (RBS), which in some networks may also be called, for example, a NodeB, a gNodeB, or an eNodeB. The service area or cell area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation telecommunications network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and this work continues in the coming 3GPP releases, such as 5G networks for example New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as new radio (NR), focus is on a set of features such as the use of very many transmit- and receive-antenna elements that makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

A key function of 5G Core network is to allow for flexibility in network service creation, making use of different network functions suitable for the offered service in a specific network slice, e.g., Evolved Mobile Broadband (MBB), Massive Machine Type Communication (MTC), Critical MTC, Enterprise, etc.

In addition to Service optimized networks there are more drivers for Network slicing, such as:

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator service and therefore only provide low risk.

Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices.

Optimized use of resources: Today the network is supporting many different services but with new use cases and more diverging requirements there is a need for optimize the network for the specific type use case. Network slicing allows to match services to optimized network instances, and it also allows for a more optimized use of those specific resources.

Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool.

Slicing may also be used to isolate different services in an operator's network. The goal of the network slice selection mechanism is therefore to direct a wireless device to the correct network slice as early as possible and to avoid re-direction from one network slice to another, which breaks the isolation between the network slices.

Slicing in NR.

Network slicing was developed to answer how to build and manage a network, that meets and exceeds the emerging requirements from a wide range of users. The network slice is a logically separated, self-contained, independent, and secured part of the network, targeting different services with different requirements on speed, latency, and reliability. Network slice characteristics are for example low latency, high bandwidth, and ultra-reliability for a critical IoT use case or higher latency and lower bandwidth for a massive IoT use case. A network slice can be dedicated to one enterprise or shared by multiple tenants. For example, a slice may consist of dedicated radio, transport and core resources including a dedicated user plane function at the edge. Another slice shares radio & transport resources between tenants but provides dedicated core network functions per tenant.

Slicing in RAN.

To enable a sliced network, both core and RAN may allocate a slice. A study on NR RAN slicing has been undertaken by 3GPP and a technical report containing various obstacles and possible way forward has been proposed in TR38.832.

A general problem introduced by slicing is the unavailability of all slices in all RAN areas. Broadly, they can be classified as—

Multiple and different slices may be supported on different frequencies

Multiple and different slices may be supported on the same frequency in different regions In TR 38.832, these problems have been discussed in depth along and the following issues are studied:

Issue 1: The UE is unaware of the slices supported on different cells or frequencies, which prevents the UE from (re)select to the cell or frequency supporting the intended slice.

Issue 2: Dedicated priorities would not be available to the UE prior to first radio resource control (RRC) connection establishment and only remain valid before T320 expires upon entering IDLE mode. In addition, dedicated priorities are discarded each time when the UE entering CONNECTED mode and need to be configured again before the UE leaving CONNECTED mode.

Issue 3: Operator may require different frequency priority configurations for the specific slice in different areas, however the dedicated priority always overwrites the broadcast priorities if configured.

Issue 4: If the serving cell is unable to support the requested slices, the serving cell may need to perform handover to a cell supporting the requested slices or release the RRC connection. That may increase control plane signalling overhead as well as long control plane latency for the UE to access the network.

Relevant solutions are also proposed in TR 38.832; however, they are high level solutions and needs to be further studied in future.

Minimization of Drive Tests (MDT).

MDT was standardized for NR in release (Rel)-16 to reduce the amount of drive tests performed manually. It is a UE assisted framework where network measurements are collected by both IDLE/INACTIVE and RRC Connected UE(s) in order to aid the network in gathering valuable information. It has been specified for both LTE and NR in TS 37.320.

MDT Types Based on RRC States.

In general, there are two types of MDT measurement logging, i.e., Logged MDT and Immediate MDT.

Logged MDT.

A UE in RRC_IDLE/RRC_INACTIVE state is configured to perform periodical and event triggered MDT logging after receiving the MDT configurations from the network. The UE shall report the DL pilot strength measurements, such as reference signal received power (RSRP) and/or reference signal received quality (RSRQ), together with time information, detailed location information if available, and WLAN, Bluetooth to the network via using the UE information framework when it is in RRC_CONNECTED state. The DL pilot strength measurement of Logged MDT is collected based on the existing measurements required for cell reselection purpose, without imposing UE to perform additional measurements.

TABLE 1

The measurement logging for Logged MDT

| MDT mode | RRC states | Measurement quantities |
|---|---|---|
| Logged MDT | RRC_IDLE and/or RRC_INACTIVE | RSRP and RSRQ of the serving cell and available UE measurements for intra-frequency/inter-frequency/inter-radio access technology (RAT), time stamp and detailed location information if available. |

For Periodical Logged MDT, UE receives the MDT configurations including logginginterval and loggingduration in the RRC message, i.e., LoggedMeasurementConfiguration, from the network. A timer, denoted as T330, is started at the UE upon receiving the configurations and set to loggingduration (10 min-120 min). The UE shall perform periodical MDT logging with the interval set to logginginterval (1.28 s-61.44 s) when the UE is in RRC_IDLE. An example of the MDT logging is shown in FIG. 1.

For event triggered Logged MDT UE receives eventType and logginginterval from the network. UE logs the measurement reports at every logginginterval if event configured in eventType is satisfied.

SUMMARY

A UE obtains slices that are supported in a current registration area, which slices are not supported in the current registration area. During a registration procedure, the UE sends a list of the slices that the UE wants to use to an Access and Mobility Management Function (AMF). The AMF replies with the list of slices that are supported and a list of slices that are not supported in the current registration area. If a higher layer application of the UE requests for a service associated to a slice that is in the supported list, then the UE's non access stratum (NAS) layer indicates to the higher layer application that the requested slice is supported. Also, if the UE's higher layer application requests for a service associated to a slice that is in a rejected list of slices, then the UE's NAS layer indicates to the higher layer application that the requested slice is not supported.

Furthermore, there are discussions to make a slice specific inactive/idle mode for UE mobility. Currently, the UE is not aware of which slices that are supported by a RAN based on information that have been broadcast to the UE. To solve this issue, below two solutions were identified as most useful in TR38.832 and are recommended for normative phase in Rel-17.

Solution 3: Slice related information for cell selection, e.g., supported slice information of serving cell and neighboring cells, is provided in the system information.

Solution 4: Slice related information for cell reselection is provided in the system information or RRCRelease message.

However, a network may not be aware that the UE's application layer wants a service belonging to a slice that was not supported in a given location i.e., from a slice point of view there is a coverage hole. If many UEs face such problems, it is beneficial for the network to learn regarding those UEs and take necessary actions.

An object of embodiments herein is to provide a mechanism for enabling communication (enabling service related to a slice) in a communication network in an efficient manner.

According to an aspect the object is achieved by a method performed by a UE for handling usage of a service in a communication network. The UE stores a first set of information related to an unavailability or availability of a slice in an area; and transmits an indication of the stored first set of information to a radio network node.

According to another aspect the object is achieved by a method performed by a radio network node for handling usage of a service in a communication network. The radio network node receives from a UE an indication of a first set of information related to an unavailability or availability of a slice in an area and performs an action taking the indicated first set of information into account.

It is furthermore provided herein a computer program comprising instructions, which, when executed on at least one processor, cause the at least one processor to carry out any of the methods above, as performed by the UE or the radio network node, respectively. It is additionally provided herein a computer-readable storage medium, having stored thereon a computer program comprising instructions which, when executed on at least one processor, cause the at least one processor to carry out the methods above, as performed by the UE or the radio network node, respectively.

According to yet another aspect the object is achieved, according to embodiments herein, by providing a radio network node and UE configured to perform the methods herein, respectively.

According to still another aspect the object is achieved by providing a UE for handling usage of a service in a communication network. The UE is configured to store a first set of information related to an unavailability or availability of a slice in an area; and to transmit an indication of the stored first set of information to a radio network node.

According to yet still another aspect the object is achieved by providing a radio network node for handling usage of a service in a communication network. The radio network node is configured to receive from a UE an indication of a first set of information related to an unavailability or availability of a slice in an area, and to perform an action taking the indicated first set of information into account.

Embodiments herein introduce a new functionality wherein the UE stores the first set of information related to which one or more slices are supported, and which one or more slices are not supported. The first set of information may further include additional information to aid network slice coverage and capacity optimization. This enables the network to identify certain coverage gaps from slice point of view. Furthermore, network may take necessary steps to resolve those gaps in an efficient manner. Thus, enabling communication, enabling service related to a slice, in the communication network in an efficient manner.

BRIEF DESCRIPTION OF THE DRAWINGS

Embodiments will now be described in more detail in relation to the enclosed drawings, in which.

DETAILED DESCRIPTION

Figure 1:
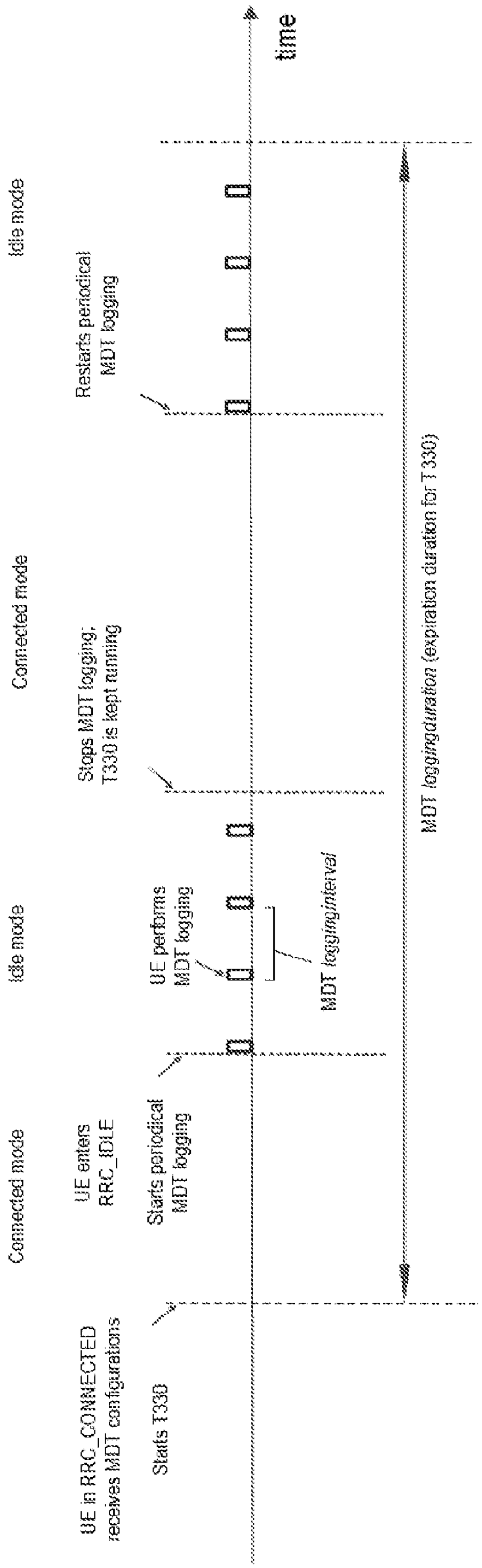
FIG. 1 is a schematic overview according to prior art.
Figure 2:
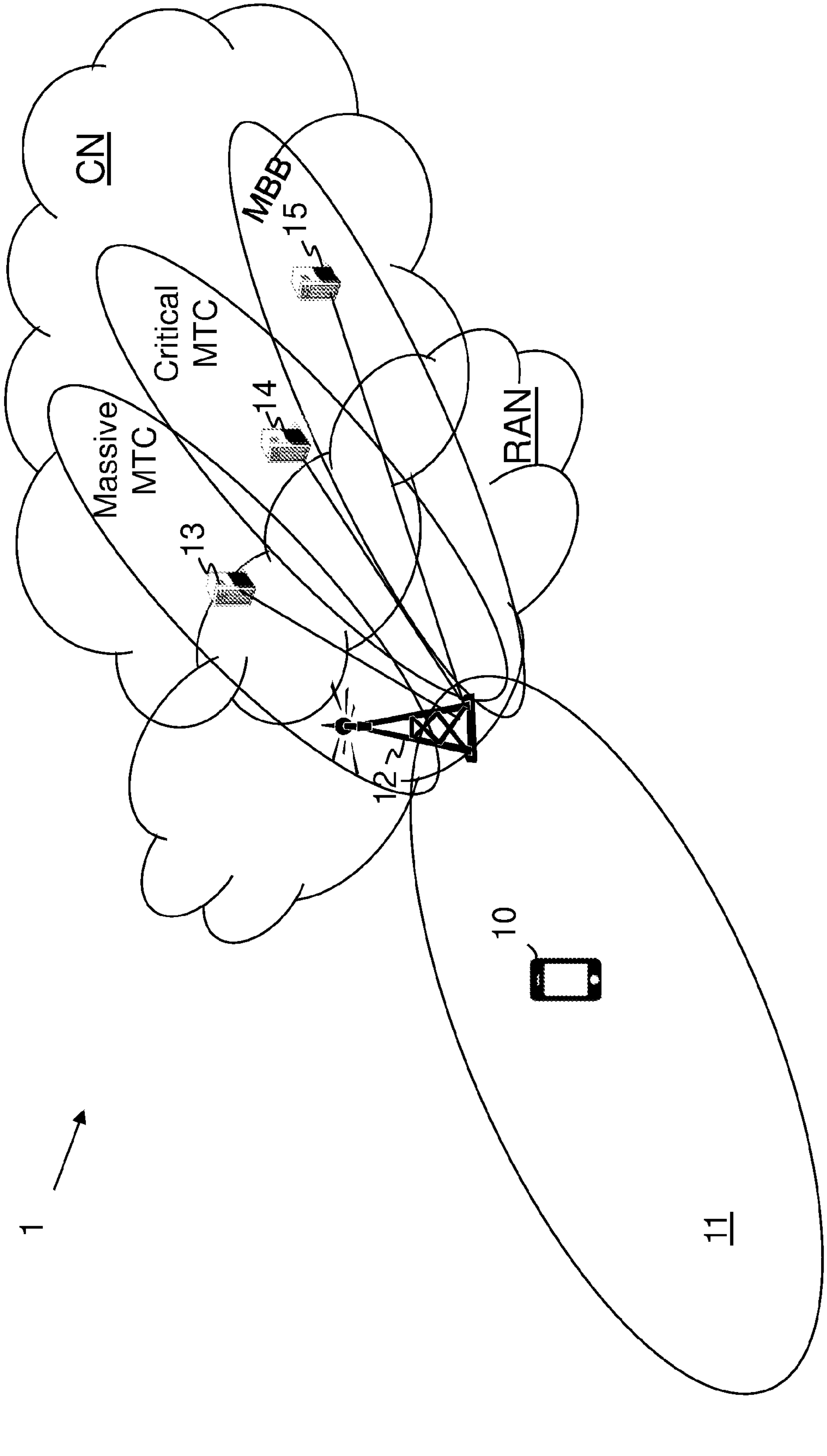
FIG. 2 is a schematic overview depicting a communication network according to embodiments herein.

Embodiments herein relate to communication networks in general. FIG. 2 is a schematic overview depicting a communication network 1. The communication network 1 comprises a wireless communication network comprising one or more RANs and one or more CNs. The communication network 1 may use a number of different technologies, such as Wi-Fi, Long Term Evolution (LTE), LTE-Advanced, NR, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. WCDMA and LTE.

In the communication network 1, wireless devices e.g. a user equipment (UE) 10 such as a mobile station, a non-access point (non-AP) STA, a STA, a wireless device and/or a wireless terminal, communicate via one or more Access Networks (AN), e.g. RAN, to one or more core networks (CN). It should be understood by those skilled in the art that "UE" is a non-limiting term which means any terminal, wireless communication terminal, internet of things (IoT) capable device, Machine Type Communication (MTC) device, Device to Device (D2D) terminal, or node, e.g., smart phone, laptop, mobile phone, sensor, relay, mobile tablets or even a base station communicating within a cell.

The communication network 1 comprises a radio network node 12 providing radio coverage over a geographical area, a first service area, of a first radio access technology (RAT), such as NR, LTE, UMTS, Wi-Fi or similar. The radio network node 12 may be a radio access network node such as radio network controller or an access point such as a wireless local area network (WLAN) access point or an Access Point Station (AP STA), an access controller, a base station, e.g. a radio base station such as a NodeB an evolved Node B (eNB, eNodeB), a base transceiver station, Access Point Base Station, base station router, a transmission arrangement of a radio base station, a standalone access point or any other network unit capable of serving a UE within the service area served by the radio network node 12 depending e.g. on the first radio access technology and terminology used.

It should be noted that the communication network 1 comprises a core network (CN) and/or RAN that are virtually network sliced into a number of slices also referred to as network slices, each network slice or RAN/core network slice supports a type of UEs and/or a type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise one or more network nodes. For example, a first network slice for, e.g., massive MTC devices may comprise a first network node 13. A second network slice for, e.g., critical MTC devices may comprise a second network node 14. A third network slice for, e.g., MBB devices may comprise a third network node 15. Each network slice supports a set of functionalities out of a total set of functionalities in the communication network. E.g. the first network node 13 supports a first set of functionalities out of the total set of functionalities in the communication network 1. The first set of functionalities is separated from a different set of functionalities out of the total set of functionalities in the communication network 1. E.g., the first set of functionalities being associated with Massive MTC devices is separated or logically separated from a second set of functionalities of the second network slice. Examples herein may cover any of the referenced network nodes. The first set of functionalities may use one or more resources in a core network and/or a RAN of the communication network, which one or more resources are separated from other resources used by a different set of functionalities, i.e., different network slices, out of the total set of functionalities in the communication network 1. The resources may then be dedicated or virtually dedicated for each set of functionalities or network slice. Thus, the first network node is separated from other network nodes supporting a second set of functionalities out of the total set of functionalities in the communication network. Separated as used herein means physical separated wherein the network nodes may be executed on different hardware platforms and therefore using different resources of the hardware, and logically separated wherein the network nodes may be executed on a same hardware platform and use different resources such as memory parts or resources of processor capacity but may also use some same resources of the hardware e.g. a single physical network node may be partitioned into multiple virtual network nodes.

Embodiments herein address problems in a scenario where certain network slices are not supported by the communication network 1 in a certain area and UE or UEs requiring those slices, or network slices, in the same area. The UE 10 stores such information and transmits an indication to the communication network 1. The communication network 1 e.g., via the radio network node 12, may take further actions to resolve such issues for future UE(s). Thus, the communication network 1, e.g., the radio network node 12, may identify certain coverage gaps from a slice point of view and may take necessary steps to resolve those gaps.

- Embodiments are herein applicable to RAN slicing.
- Network node and RAN node are used interchangeably. A non-limiting example of a network node or a RAN node may be any of: eNB, gNB, gNB-central unit (CU), gNB-CU-control plane (CP), gNB-distributed unit (DU).
- The term wireless terminal/device and UE are interchangeable and refers to any device capable of being served/used by a network node, e.g. the radio network node 12.
- Embodiments may be applicable for virtual RAN (vRAN) slice as well as virtual core (vCORE) slices.

Figure 3:
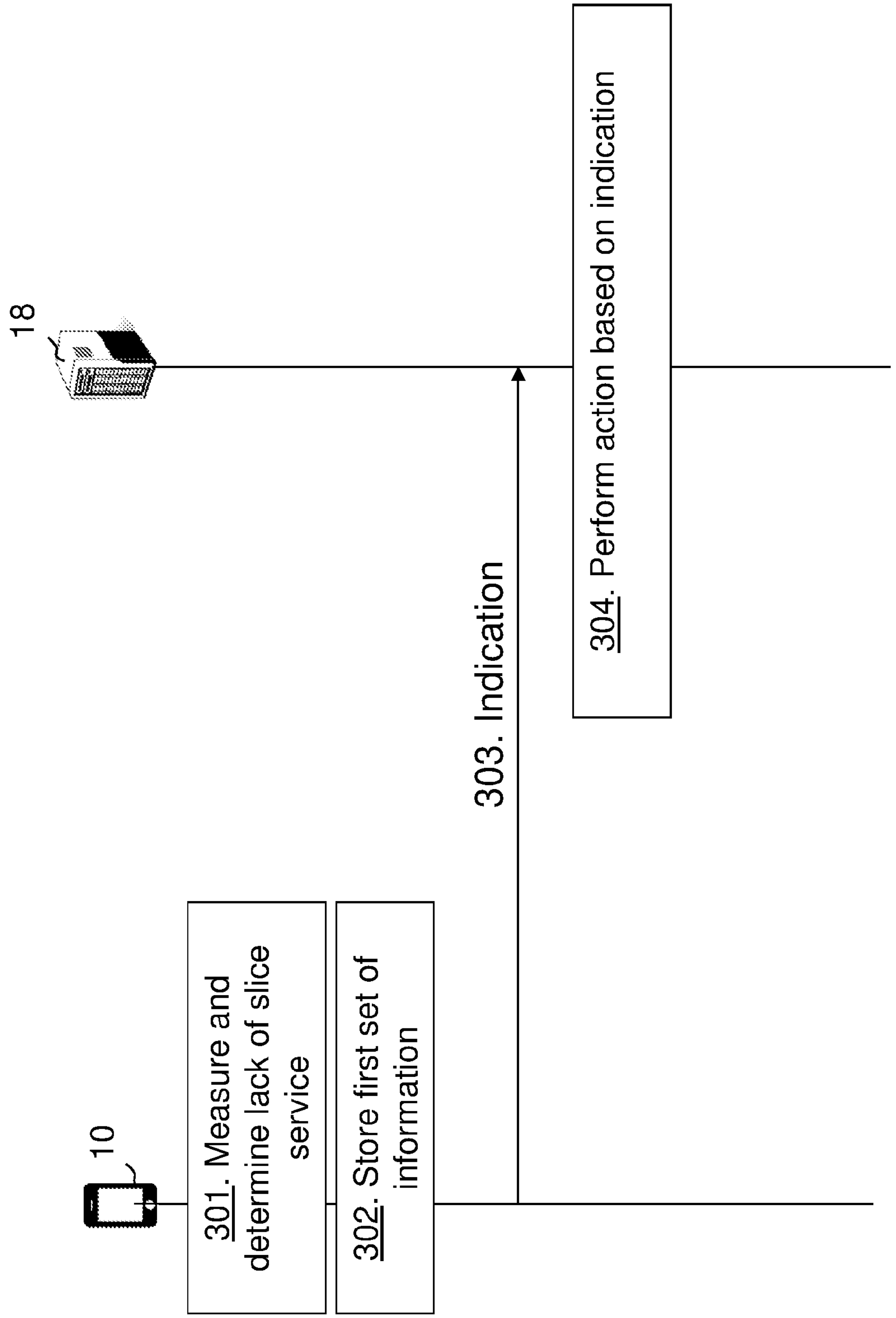
FIG. 3 is a combined flowchart and signalling scheme according to embodiments herein.

FIG. 3 is a combined flowchart and signalling scheme according to some embodiments herein exemplifying one embodiment herein.

Action 301. The UE 10 may perform measurements and determine availability and/or unavailability of a network slice in an area.

Action 302. The UE 10 stores a first set of information related to the slice availability and/or unavailability in that area.

Action 303. The UE 10 transmits an indication of the stored information to the radio network node. For example, the UE 10 may transmit the stored information or an index indicating the stored information.

Action 304. The radio network node 12 performs an action taking the first set of information into account. For example, the radio network node 12 may make one or more slice available that is needed most often by the UEs or that is needed to cover gaps of slice availability.

The methods according to embodiments herein may comprise any one or more of the following:

- Identifying a need of a slice in a certain area.
- Identifying a presence or absence of such slice availability in that area.
- Storing a first set of information related to the slice unavailability in that area.
- Transmitting the stored information to the communication network 1.

Identification of the presence or absence of a slice in a certain area may comprise any one or more of:

- Determining information from the information provided by the network, e.g. the radio network node 12, e.g. which information may have been broadcast/provided in a dedicated RRC message.
- Requesting the network, e.g., the radio network node 12, for information regarding the slices
- Receiving response from the network, e.g., the radio network node 12, and determining the supported slices and/or unavailable slices from the response.

The first set of information in may be exemplified (not limited to) as any one or more of below:

1) Information regarding slices that were available and/or the slices that were unavailable.
2) Information regarding serving/camping cell.
3) Information regarding neighboring cell
4) Information regarding UE location.

Furthermore, it is herein provided a method performed by the radio network node 12, to identify problems reported by the UE 10 and perform further actions, the method comprises of

- Receiving unavailable slice related information from the UE 10, i.e., the indication.
- Performing actions according to the report.

The network actions mentioned may be exemplified as (not limited to) any one or more of below:

1) Making one or more slice that is needed most often by the UEs or that is needed to ensure certain slice specific service level agreement (SLA) available in the area.

Figure 4A:
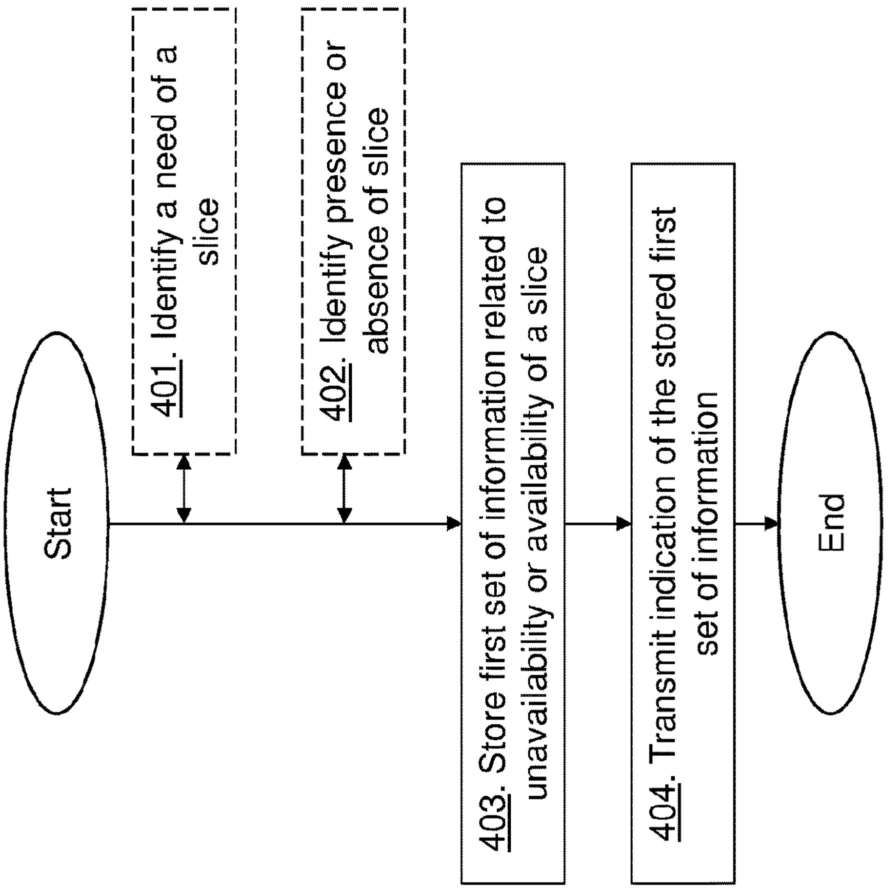
FIGS. 4*a-c* are combined flowchart and signalling schemes according to embodiments herein.

The method actions performed by the UE 10 for handling usage of a service in the communication network according to embodiments will now be described with reference to a flowchart depicted in FIG. 4. The actions do not have to be taken in the order stated below but may be taken in any suitable order. Dashed boxes indicate optional features. The communication network 1, i.e., the radio network node 12 or another radio network node, may configure the UE 10 to log slice related information.

Action 401. The UE 10 may identify a need of a slice in the area.

Action 402. The UE 10 may identify a presence or absence of the slice in the area. The UE 10 may, for example, identify the presence or absence of the slice by performing one or more of the following:

determining the presence or absence of the slice based on information provided by the communication network. The information may be broadcast by the radio network node 12 or another radio network node, or the information may be provided through a dedicated signalling using a dedicated message to the UE 10;

requesting the communication network regarding the presence or absence of the slice; and receiving a response from the communication network and determining the presence or absence of the slice based on the response.

Action 403. The UE 10 stores the first set of information related to the unavailability or availability of a slice in the area. The first set of information may comprise one or more of the following:

information regarding one or more slices that were available and/or one or more slices that were unavailable, such information may comprise of Single Network Slice Selection Assistance Information (S-NSSAI), slice/service type (SST);

information regarding a serving and/or camping cell. The UE 10 may log the cell global identity (CGI) or physical cell identify (PCI) and frequency of the serving cell. The UE may log beam information such as Synchronization Signal/PBCH block (SSB) of the serving cell;

information regarding a neighboring cell. The UE 10 may log CGI or PCI and frequency(-ies) of the neighbor cell(s); and information regarding a UE location. Location information may include position/location information from Global Navigation Satellite Systems (GNSS) and/or Globalnaya Navigatsionnaya Sputnikovaya Sistema (GLONASS) information; available WLAN information; and/or available Bluetooth information.

Action 404. The UE 10 further transmits an indication of the stored first set of information to a radio network node 12. The indication may be transmitted: upon transitioning to an RRC_Connected state; using an existing logged MDT message; and/or a new message.

Figure 4B:
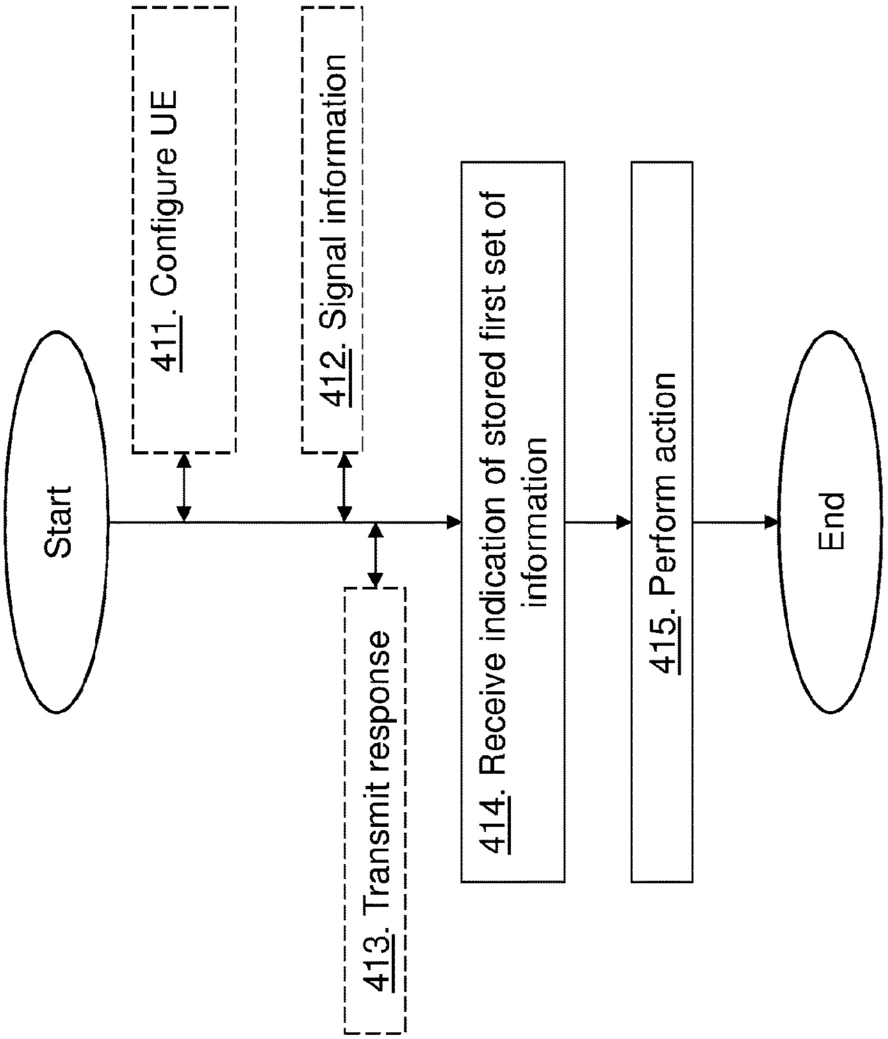

The method actions performed by the radio network node 12 for handling usage of a service in the communication network according to embodiments will now be described with reference to a flowchart depicted in FIG. 4*b*. The actions do not have to be taken in the order stated below but may be taken in any suitable order. Dashed boxes indicate optional features.

Action 411. The radio network node 12 may configure the UE 10 to log slice related information. The radio network node 12 may configure the UE 10 with a new event triggered logged MDT, wherein at every instance when a UE's request for a slice is unfulfilled, an event entering criterion is met and the UE logs the measurement. The radio network node 12 may configure the UE 10 to log the slice related information by transmitting a flag in a message. Presence of the flag indicates to the UE 10 to log un-available slice information whereas absence of the flag indicates that the UE 10 doesn't log the slice information as part of logged MDT report. In another example, the flag may always be present. In such scenario Flag value 1 refers to UE logging slice information in Logged MDT report; a Flag value 0 refers to UE not logging slice information in Logged MDT report.

Action 412. The radio network node 12 may signal to the UE 10, information relating to availability of one or more slices in the area. The information may be broadcast or dedicated signalled to the UE 10.

Action 413. Alternatively, the radio network node 12 may, upon request, transmit a response indicating the availability of one or more slices in the area.

Action 414. The radio network node 12 receives from the UE 10 the indication of the first set of information related to the unavailability or availability of a slice in the area. The first set of information may comprise one or more of the following:

information regarding one or more slices that were available and/or one or more slices that were unavailable, such information may comprise of S-NSSAI and/or SST;

information regarding a serving and/or camping cell. The UE 10 may log the CGI or PCI and frequency of the serving cell. The UE 10 may log beam information such as SSB of the serving cell;

information regarding a neighboring cell. The UE 10 may log CGI or PCI and frequency(-ies) of the neighbor cell(s); and information regarding a UE location. Location information may GNSS and/or GLONASS information; available WLAN information; and/or available Bluetooth information Action 415. The radio network node 12 performs an action taking the indicated first set of information into account. For example, the radio network node 12 may make one or more slice available in the area based on the received indication.

Figure 4C:
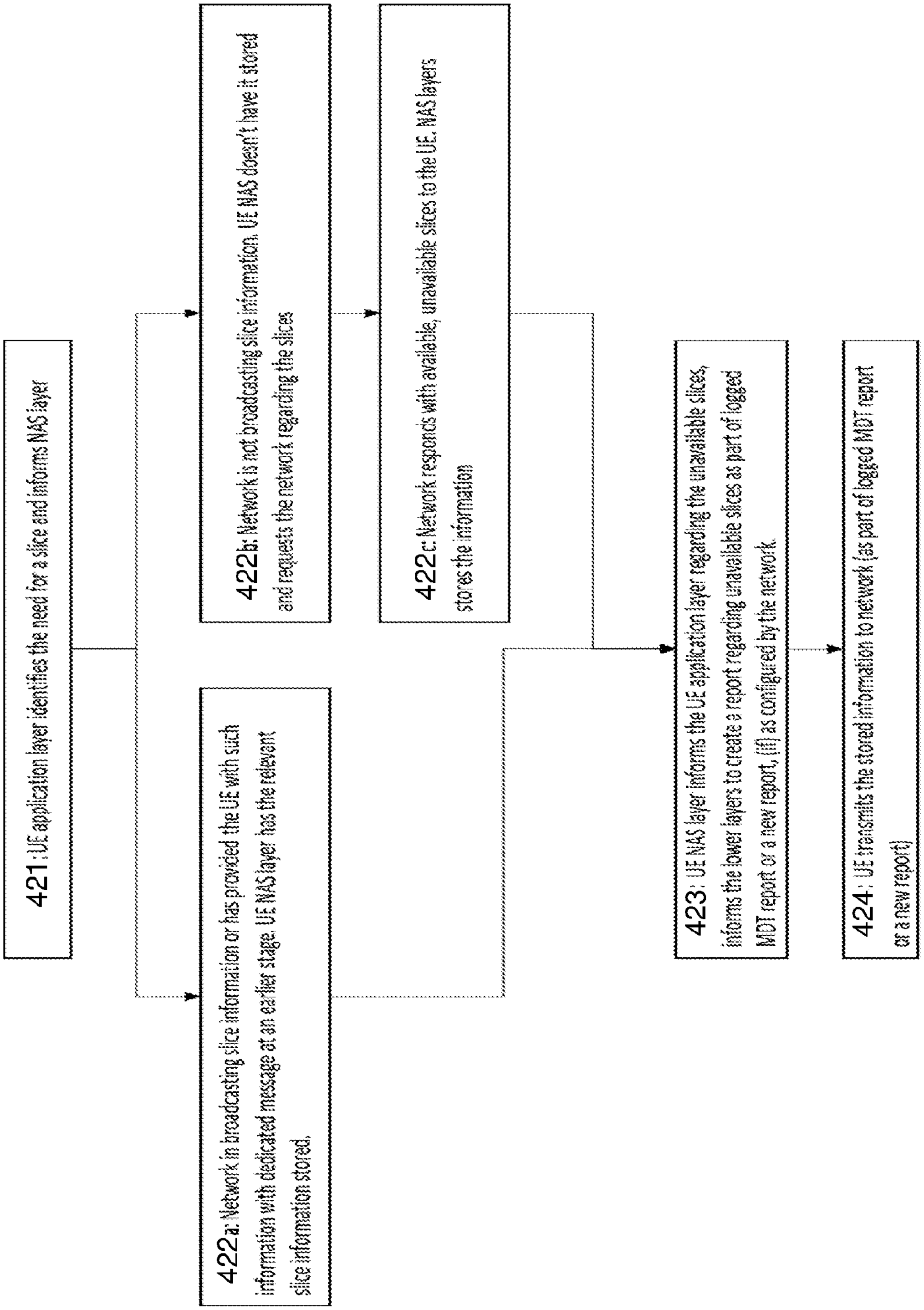

Any of the above methods of embodiments herein may additionally and/or alternatively comprise any one or more of the actions exemplified in FIG. 4*c:*

Identifying (421) the need of a slice in a certain area.

Identifying (422) the presence or absence of such slice availability in that area.

Storing (423) a first set of information related to the slice unavailability in that area.

Transmitting (424) the stored information to the network.

Identification of the presence or absence of slice (422) in a certain area may comprise one or more of:

Determining (422*a*) the information from the information provided by the network (broadcasted/provided in a dedicated RRC message).

Requesting (422*b*) the network regarding the slices

Receiving (422*c*) response from the network and determining the supported slices and/or unavailable slices from the response.

The first set of information in (423) may be exemplified (not limited to) as below:

5) Information regarding slices that were available and/or the slices that were unavailable.
6) Information regarding serving/camping cell.
7) Information regarding neighboring cell
8) Information regarding UE location.

Furthermore, it is herein provided a method performed by the radio network node, to identify problems reported by the UE and perform further actions, the method comprises of Receiving, see action 414, unavailable slice related information, from action 423, from the UE 10.

Performing, see action 415, actions according to the report.

The network actions mentioned in action 415 may be exemplified as (not limited to) below:

2) Making one or more slice that is needed most often by the UEs or that is needed to ensure certain slice specific SLA available in the area.

The first network node 13 may support the first set of functionalities out of the total set of functionalities in the communication network 1. As stated above the first set of functionalities is separated from a different set of functionalities out of the total set of functionalities in the communication network, i.e. the first network node 13 supports the first network slice separated from different network slices. The first set of functionalities may be associated with a certain type of UEs, a certain enterprise, a certain operator or a certain agreement.

The actions do not have to be taken in the order stated above, but may be taken in any suitable order. Actions performed in some embodiments are marked with dashed boxes.

Thus, it herein provided a method implemented by a UE, to aid the network, e.g. the communication network 1 and/or the radio network 12, to identify the need for some slices in a specific area. The methods herein may comprise one or more of the following:

The application layer of the UE 10 may identify a need for certain slices in the network. It provides its NAS layer with relevant information.

NAS layer of the UE 10 may further identify the presence or absence of such slices in the current area the UE 10 belongs to. NAS layer may inform this to application layer and may inform the lower layer to log relevant information.

The network, e.g. the radio network 12, may be broadcasting the available slices in the area or may have provided the UE 10 with such information in dedicated message at an earlier stage. The UE NAS has the information readily available.

The network may not be transmitting such information and the UE NAS may request the slice(s) to the network and the UE 10 may identify the unavailable ones after receiving responses from the network.

The UE 10 may then log the unavailable slice information in a report. The information may contain below information:

1) Information regarding slice that was unavailable.
   a. Such information may comprise of S-NSSAI, SST.
2) Information regarding cells, e.g. any one or more out of:
   a. UE may log the CGI or PCI and frequency of the serving cell.
   b. UE may log CGI or PCI and frequency(-ies) of the neighbor cell(s).
   c. UE may log beam information (SSB) of the serving cell.
3) Information regarding UE location. Location information may include any one or more out of:
   a. GNSS/GLONAS information
   b. Available WLAN information
   c. Available Bluetooth information.

In an example, the UE 10 may log such information as part of the existing logged MDT report. In another example, the UE 10 may log such information as part of a new report.

Upon transitioning to RRC_Connected state, the UE 10 may transmit the information to network.

In an example, the UE 10 may transmit such information using existing logged MDT messages. In another example, the UE 10 may transmit such information using a new message.

It is furthermore provided a method performed by the radio network node 12, or network, that allows the network to identify problems reported by the UE(s) 10 and take further optimization actions. The method may comprise:

Receiving the indication indicating unavailable slice related information from the UE 10.

The radio network node 12 may receive the indication such as slice related information from the UE 10 as part of logged MDT report, or the network, e.g., the radio network 12, may receive the slice related information in a new report.

The radio network node 12 or the network may decide to configure the slices to be available in the given area.

The radio network node 12 may inform the UE 10 with dedicated message regarding the slice availability. In another example, the radio network node 12 may broadcast the information, also referred to as updated slice information in the area.

Additional Embodiments Related to Logged MDT Configuration.

The radio network node 12 or the network may configure the UE 10 with a new event triggered logged MDT wherein at every instance when the UE's request for slice is unfulfilled, the event entering criterion is met and the UE 10 may log the measurement.

An example implementation of the above embodiment that may be part of LoggedMeasurementConfiguration is:

```
EventType-r16 ::= CHOICE {
   outOfCoverage   NULL,
   eventL1   SEQUENCE {
    I1-Threshold   MeasTriggerQuantity,
    hysteresis   Hysteresis,
    timeToTrigger   TimeToTrigger
   },
   ...,
[[sliceSpecific   SEQUENCE {
    sliceIDList SliceIDList NSSAI,
  },]]
}
SliceIDList SEQUENCE {
    sliceID NSSAI,
  }
```

The radio network node 12 or the network may include a new flag in LoggedMeasurementConfiguration to configure the UE 10 to log slice related information. Presence of such flag indicates the UE 10 to log un-available slice information whereas absence of it indicates the UE 10 doesn't log the information as part of logged MDT report.

In another example, the flag may always be present. In such scenario:

Flag value 1 refers to the UE 10 logging slice information in Logged MDT report.

Flag value 0 refers to the UE 10 not logging slice information in Logged MDT report.

Figure 5:
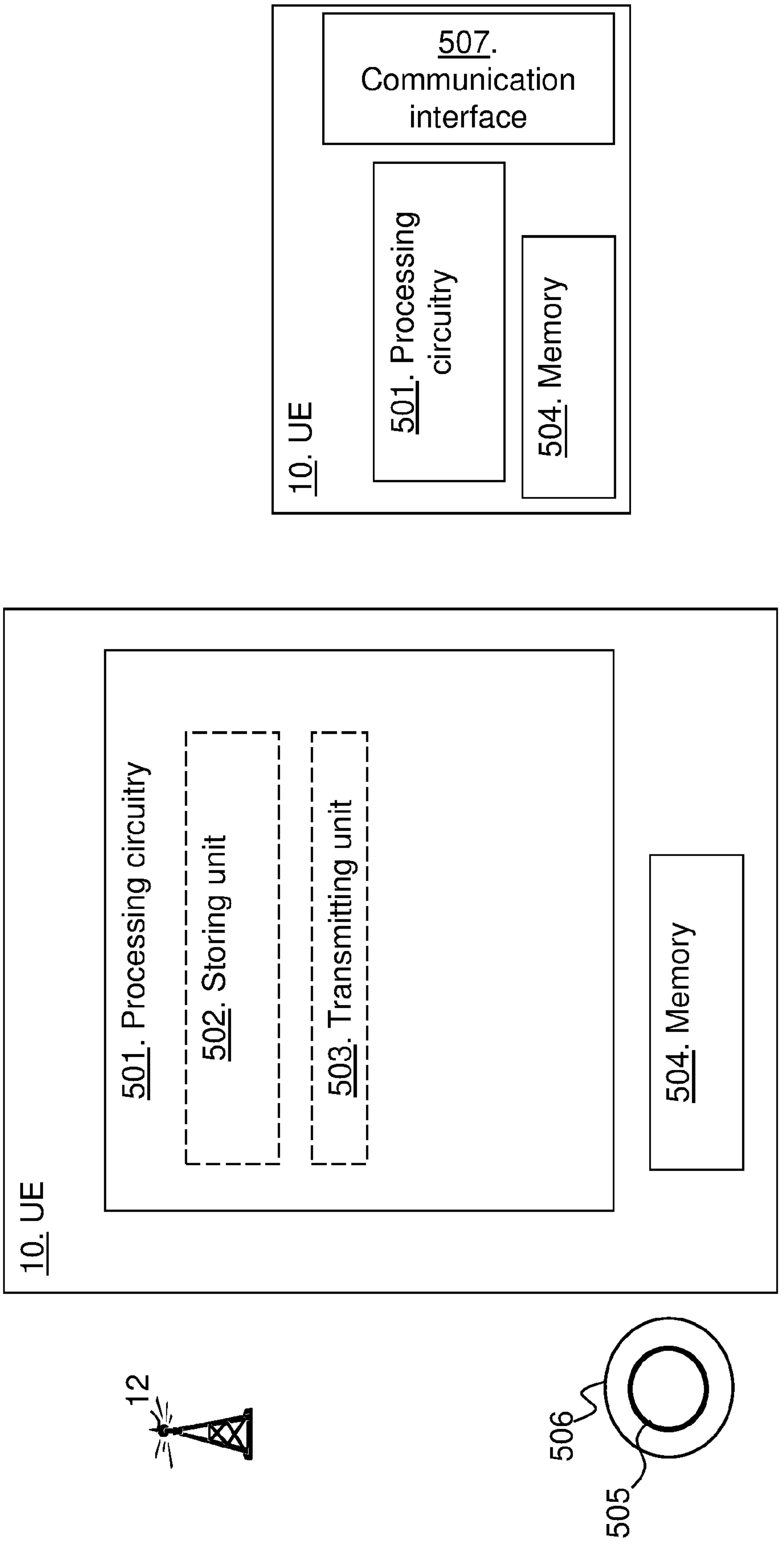
FIG. 5 is a block diagram depicting a UE according to embodiments herein.

FIG. 5 shows a block diagram depicting the UE 10 in two embodiments for handling usage of the service, or enabling communication/service of the UE 10, in the communication network.

The UE 10 may comprise processing circuitry 501, e.g. one or more processors, configured to perform the methods herein.

The UE 10 may comprise a storing unit 502, e.g. a writing unit. The UE 10, the processing circuitry 501 and/or the storing unit 502 is configured to store the first set of information related to the unavailability or availability of a slice in the area. The first set of information may comprise one or more of the following:

- information regarding one or more slices that were available and/or one or more slices that were unavailable;
- information regarding a serving and/or camping cell;
- information regarding a neighboring cell; and
- information regarding a UE location.

The UE 10 may comprise a transmitting 503, e.g. a transmitter or a transceiver. The UE 10, the processing circuitry 501 and/or the transmitting unit 503 is configured to transmit the indication of the stored first set of information to the radio network node 12. The UE 10, and/or the processing circuitry 501 may be configured to identify the need of the slice in the area. The UE 10, and/or the processing circuitry 501 may be configured to identify the presence or absence of the slice in the area. The UE 10, and/or the processing circuitry 501 may be configured to identify the presence or absence of the slice by performing one or more of the following:

- determining the presence or absence of the slice based on information provided by the communication network;
- requesting the communication network regarding the presence or absence of the slice; and
- receiving the response from the communication network and determining the presence or absence of the slice based on the response.

The UE 10, the processing circuitry 501 and/or the transmitting unit 503 may be configured to transmit the indication: upon transitioning to an RRC_Connected state; using an existing logged MDT message; and/or using a new message.

The UE 10, the processing circuitry 501 and/or the storing unit 502 may be configured to be configured by the communication network to log slice related information The UE 10 may further comprise a memory 504. The memory comprises one or more units to be used to store data on, such as indications, strengths or qualities, indications, slice information, reconfiguration, sleep mode configurations, values, scheduling information, timers, applications to perform the methods disclosed herein when being executed, and similar. The UE 10 comprises a communication interface 507 comprising transmitter, receiver, transceiver and/or one or more antennas. Thus, it is herein provided the UE for handling communication in a wireless communications network, wherein the UE comprises processing circuitry and a memory, said memory comprising instructions executable by said processing circuitry whereby said UE is operative to perform any of the methods herein.

The methods according to the embodiments described herein for the UE 10 are respectively implemented by means of, e.g., a computer program product 505 or a computer program product, comprising instructions, i.e., software code portions, which, when executed on at least one processor, cause the at least one processor to carry out the actions described herein, as performed by the UE 10. The computer program product 505 may be stored on a computer-readable storage medium 506, e.g. a universal serial bus (USB) stick, a disc or similar. The computer-readable storage medium 506, having stored thereon the computer program product, may comprise the instructions which, when executed on at least one processor, cause the at least one processor to carry out the actions described herein, as performed by the UE 10. In some embodiments, the computer-readable storage medium may be a non-transitory or transitory computer-readable storage medium.

Figure 6:
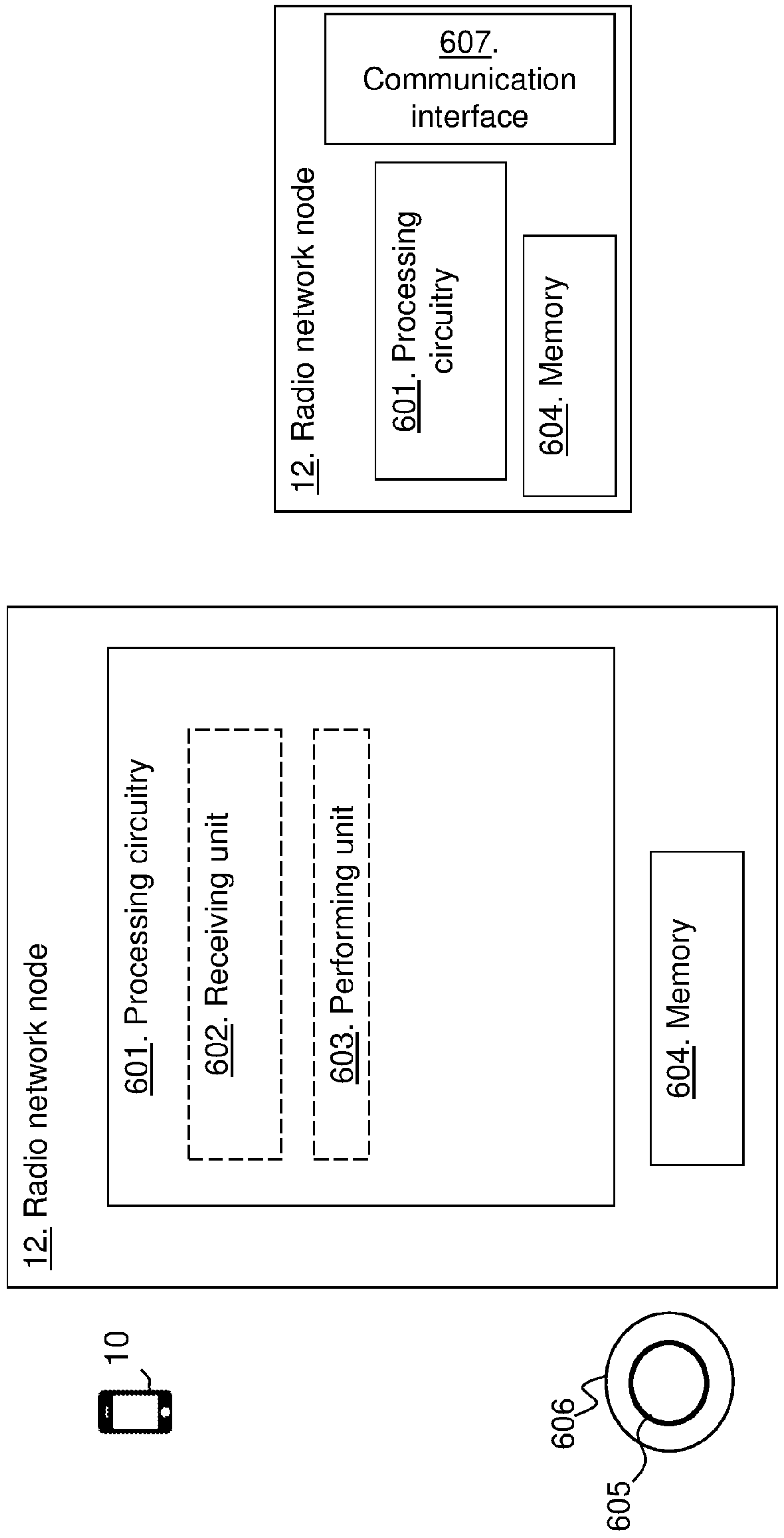
FIG. 6 is a block diagram depicting a radio network node according to embodiments herein.

FIG. 6 shows a block diagram depicting the radio network node 12 in two embodiments for handling usage of the service in the communication network.

The radio network node 12 may comprise processing circuitry 601, e.g., one or more processors, configured to perform the methods herein.

The radio network node 12 may comprise a receiving unit 602, e.g., a receiver or a transceiver. The radio network node 12, the processing circuitry 601 and/or the receiving unit 602 is configured to receive, from the UE 10, the indication of the first set of information related to the unavailability or availability of the slice in the area. The unavailability or availability of the slice may also be referred to as a slice unavailability in the area. The first set of information may comprise one or more of the following:

- information regarding one or more slices that were available and/or one or more slices that were unavailable;
- information regarding a serving and/or camping cell;
- information regarding a neighboring cell; and
- information regarding a UE location.

The radio network node 12 may comprise a performing unit 603. The radio network node 12, the processing circuitry 601 and/or the performing unit 603 is configured to perform an action taking the first set of information into account. E.g., make one or more slice available that is needed most often by the UEs or that is needed. The radio network node 12, the processing circuitry 601 and/or the performing unit 603 may be configured to perform the action by making one or more slice available in the area based on the received indication.

The radio network node 12, and/or the processing circuitry 601 may be configured to signal to the UE 10, information relating to availability of one or more slices in the area. The radio network node 12, and/or the processing circuitry 601 may be configured to upon request, transmit the response indicating the availability of one or more slices in the area.

The radio network node 12, and/or the processing circuitry 601 may be configured to configure the UE 10 with a new event triggered logged MDT, wherein at every instance when a UE's request for a slice is unfulfilled, an event entering criterion is met and the UE logs the measurement. The radio network node 12, and/or the processing circuitry 601 may be configured to configure the UE 10 to log slice related information.

The radio network node 12 further comprises a memory 604. The memory comprises one or more units to be used to store data on, such as indications, slice information, strengths or qualities, indications, reconfiguration, sleep mode configurations, values, scheduling information, timers, applications to perform the methods disclosed herein when being executed, and similar. The radio network node 12 comprises a communication interface 607 comprising transmitter, receiver, transceiver and/or one or more antennas. Thus, it is herein provided the radio network node 12 for handling communication in a communication network, wherein the radio network node 12 comprises processing circuitry and a memory, said memory comprising instructions executable by said processing circuitry whereby said radio network node 12 is operative to perform any of the methods herein.

The methods according to the embodiments described herein for the radio network node 12 are respectively implemented by means of, e.g., a computer program product 605 or a computer program product, comprising instructions, i.e., software code portions, which, when executed on at least one processor, cause the at least one processor to carry out the actions described herein, as performed by the radio network node 12. The computer program product 605 may be stored on a computer-readable storage medium 606, e.g., a universal serial bus (USB) stick, a disc or similar. The computer-readable storage medium 606, having stored thereon the computer program product, may comprise the instructions which, when executed on at least one processor, cause the at least one processor to carry out the actions described herein, as performed by the radio network node 12. In some embodiments, the computer-readable storage medium may be a non-transitory or transitory computer-readable storage medium.

Embodiments herein relate to a network with network slices, i.e., core network and/or RAN with partitioned sets of functionalities where the first network node 13 supports the first set of functionalities out of the total set of functionalities in the core network and/or RAN of the communication network 1. The first set of functionalities belongs to the first network slice of the core network and/or RAN, and is separated from another set of functionalities out of the total set of functionalities in the core network and/or RAN.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

OTT

Figure 7:
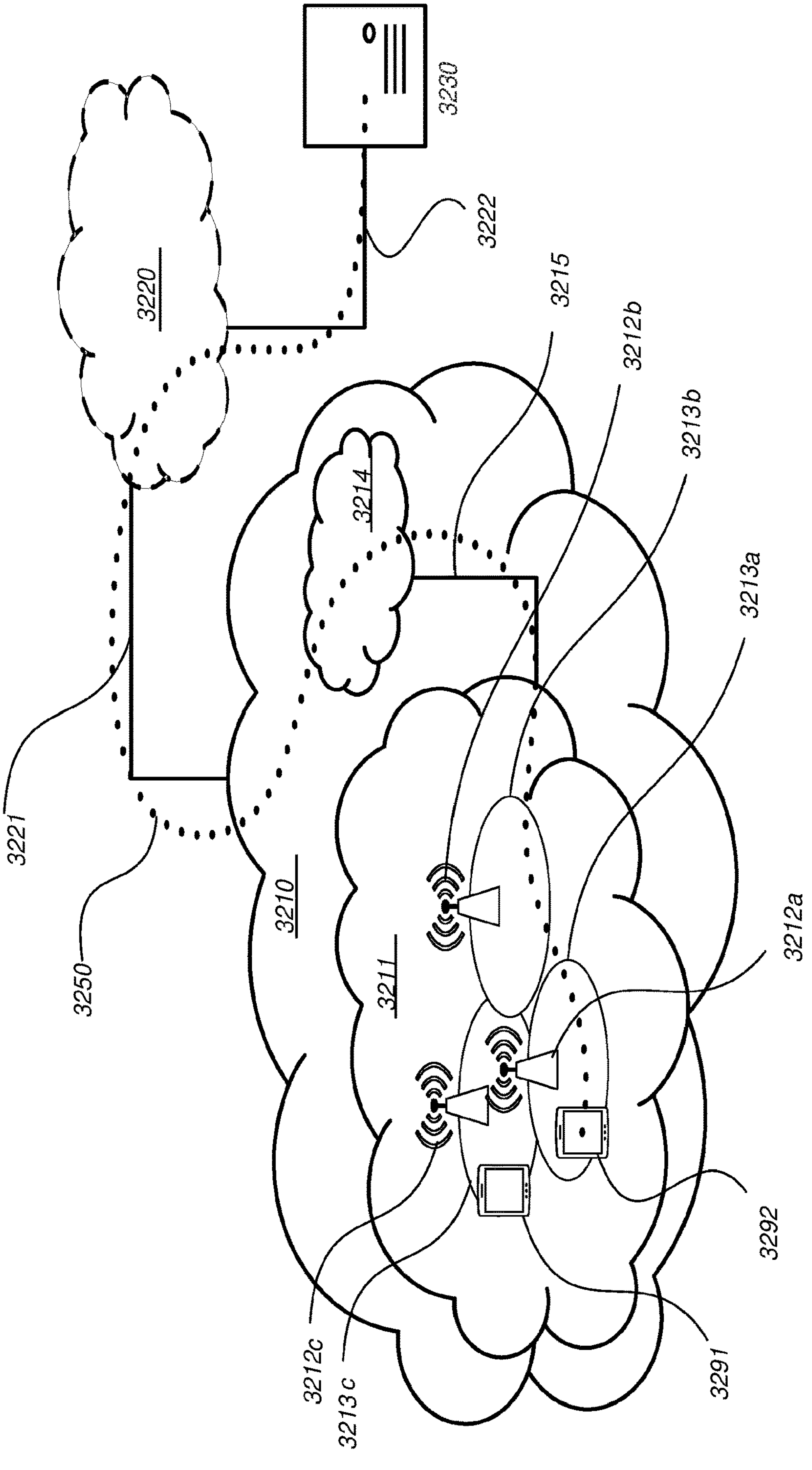
FIG. 7 schematically illustrates a telecommunication network connected via an intermediate network to a host computer.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212*a*, 3212*b*, 3212*c*, such as NBs, eNBs, gNBs or other types of wireless access points being examples of the radio network node 12 above, each defining a corresponding coverage area 3213*a*, 3213*b*, 3213*c*. Each base station 3212*a*, 3212*b*, 3212*c* is connectable to core network 3214 over a wired or wireless connection 3215. A first UE 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signalling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
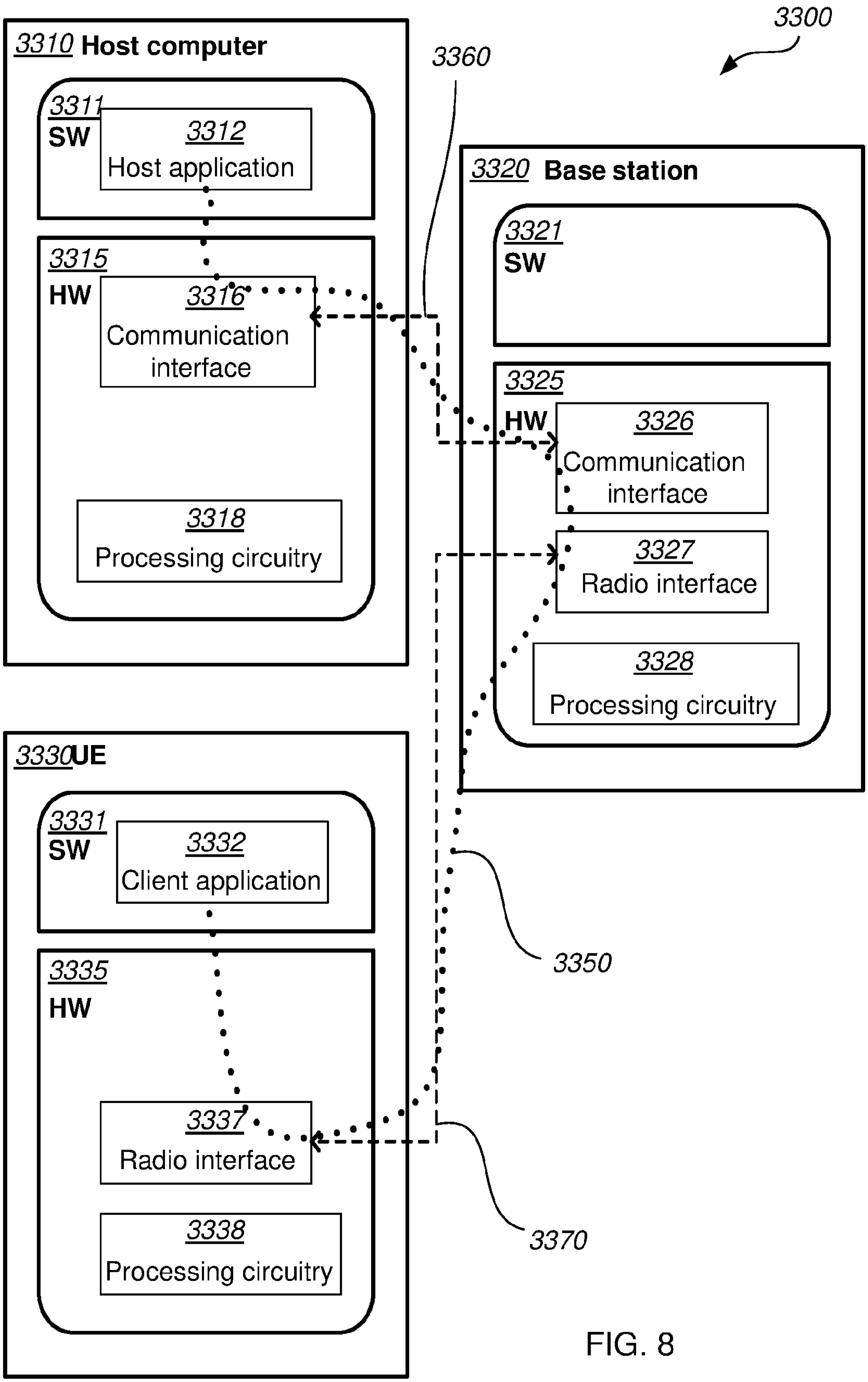
FIG. 8 is a generalized block diagram of a host computer communicating via a base station with a user equipment over a partially wireless connection.

FIG. 8 shows a host computer communicating via a base station and with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212*a*, 3212*b*, 3212*c* and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments make it possible for active slices in gaps of services resulting in a reduced delay of providing slice services and a quick responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signalling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 9:
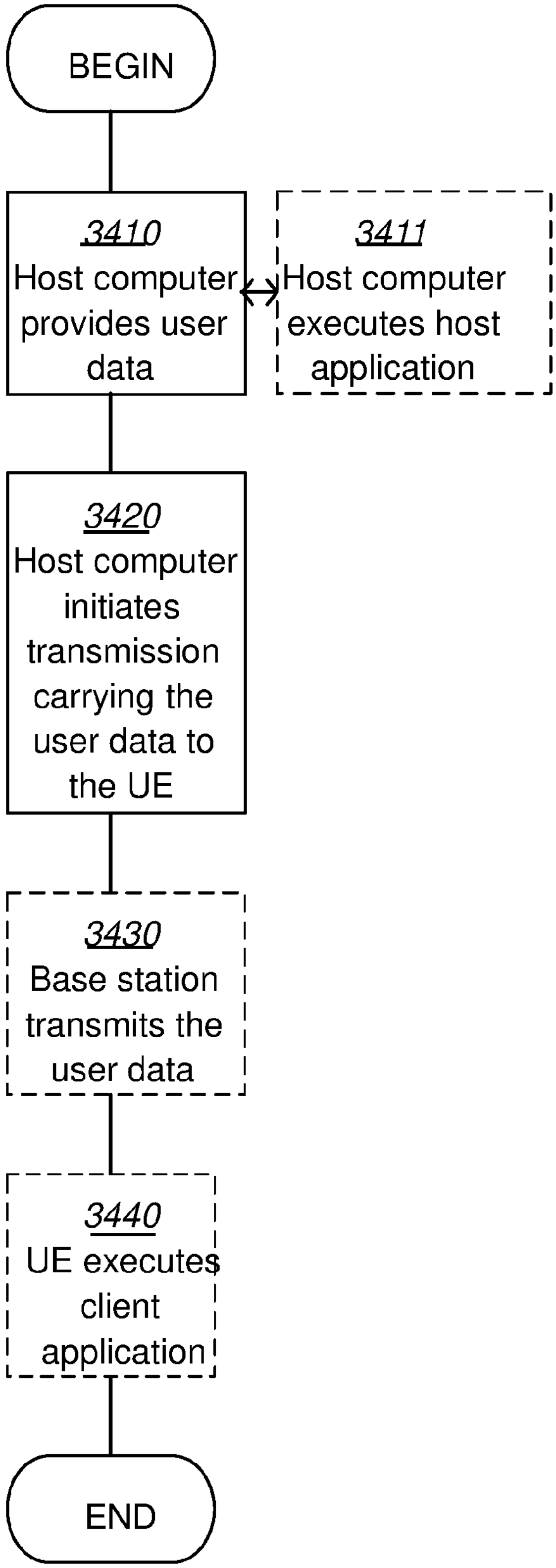
FIGS. 9-12 are flowcharts illustrating methods implemented in a communication system including a host computer, a base station and a user equipment.

FIG. 9 shows methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 10:
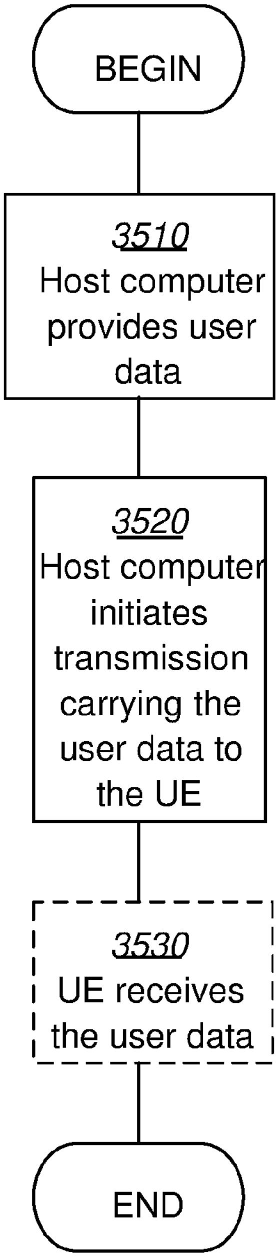

FIG. 10 shows methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 11:
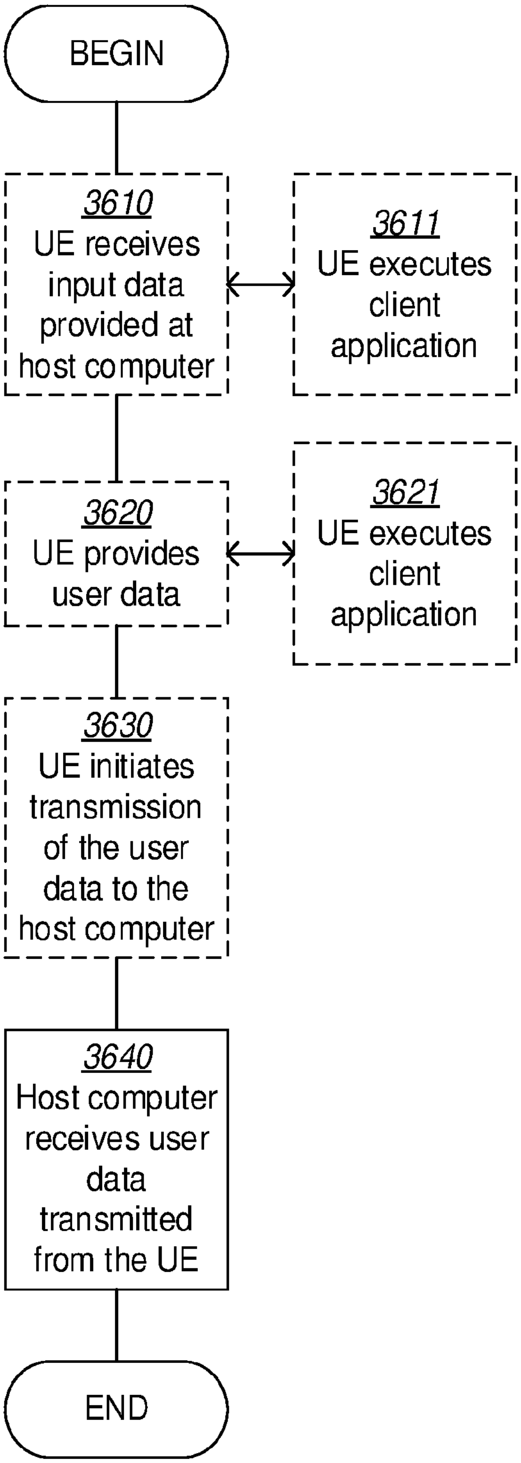

FIG. 11 shows methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 12:
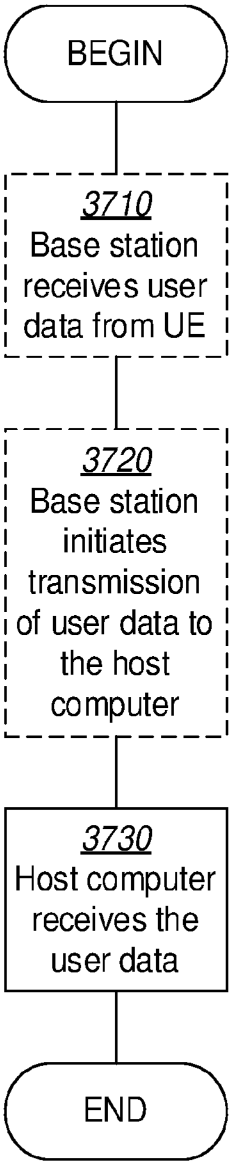

FIG. 12 show methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIG. 7 and FIG. 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment (UE), for handling usage of a service in a communication network, the method comprising receiving a data collection configuration from a network node including an indication to log slice availability information;

storing, according to the data collection configuration, a first set of information related to an unavailability or availability of a slice in an area when the UE enters an idle state; and transmitting an indication of the stored first set of information to a radio network node when the UE transitions to a RRC Connected state.

2. The method according to claim 1, further comprising: identifying a need of a slice in the area.

3. The method according to claim 1, further comprising: identifying a presence or absence of the slice in the area.

4. The method according to claim 3, wherein identifying the presence or absence of the slice comprises one or more of:

determining the presence or absence of the slice based on information provided by the communication network;

requesting the communication network regarding the presence or absence of the slice; and receiving a response from the communication network and determining the presence or absence of the slice based on the response.

5. The method according to claim 1, wherein the first set of information comprises one or more of the following:

information regarding one or more slices that were available and/or one or more slices that were unavailable;

information regarding a serving and/or camping cell;

information regarding a neighboring cell; and information regarding a UE location.

6. The method according to claim 1, wherein the indication is transmitted: upon transitioning to an RRC_Connected state; using an existing logged minimization of drive test, MDT, message; and/or a new message.

7. The method according to claim 1, wherein the communication network configures the UE to log slice related information.

8. A user equipment (UE), for handling usage of a service in a communication network, wherein the UE is configured to:

a radio unit; and processing circuitry operatively connected to the radio unit and configured to:

receive a data collection configuration from a network node including an indication to log slice availability information;

store, according to the data collection configuration, a first set of information related to an unavailability or availability of a slice in an area when the UE enters an idle state; and transmit an indication of the stored first set of information to a radio network node when the UE transitions to a RRC Connected state.

* * * * *